(No Model.)

H. A. SCHEUERLE.
DEVICE FOR PLACING BELTS UPON PULLEYS.

No. 433,825. Patented Aug. 5, 1890.

WITNESSES:
Paul Johst
C. Sedgwick

INVENTOR:
H. A. Scheuerle

BY Munn & Co.
ATTORNEYS

UNITED STATES PATENT OFFICE.

HENRY ADAM SCHEUERLE, OF PHILADELPHIA, PENNSYLVANIA.

DEVICE FOR PLACING BELTS UPON PULLEYS.

SPECIFICATION forming part of Letters Patent No. 433,825, dated August 5, 1890.

Application filed November 16, 1889. Serial No. 330,572. (No model.)

*To all whom it may concern:*

Be it known that I, HENRY ADAM SCHEUERLE, of Philadelphia, in the county of Philadelphia and State of Pennsylvania, have invented a new and Improved Device for Placing Belts upon Pulleys, of which the following is a full, clear, and exact description.

My invention relates to an improved device for placing belts upon pulleys when the latter are in motion; and the object of the invention is to provide a device of exceedingly simple construction, and which may be conveniently used to expeditiously place a belt upon a pulley, whether the pulley be located near the ground or at quite a height therefrom and without danger to the operator.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1:
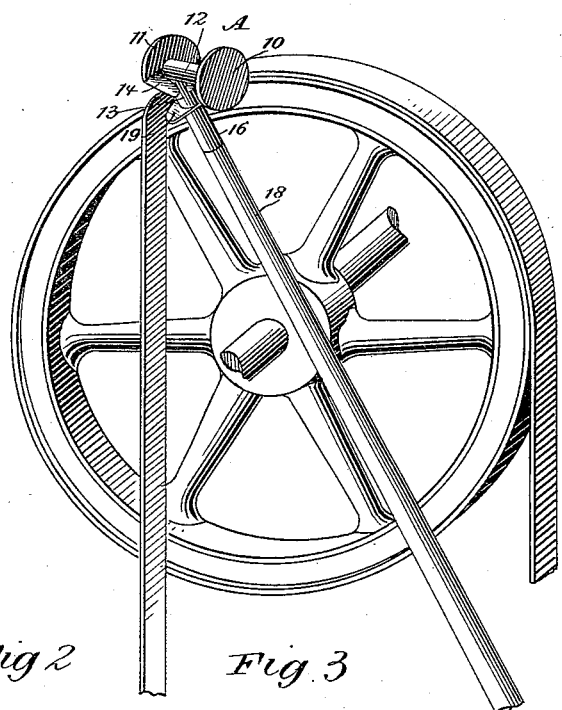
Figure 2:
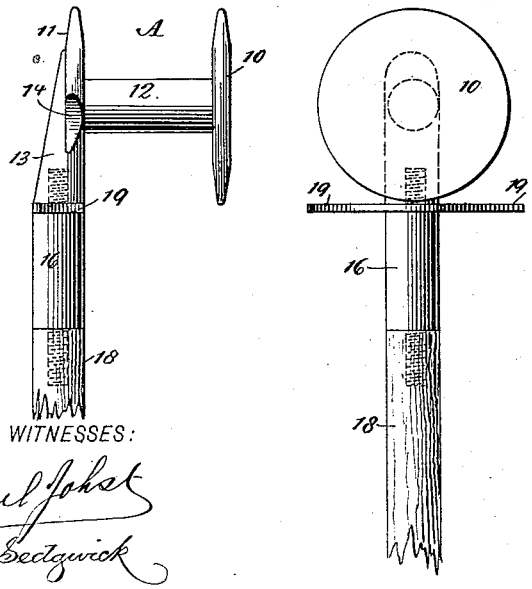
Figure 3:
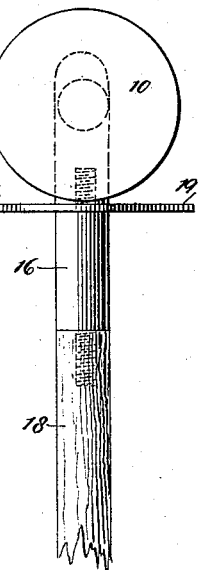

Figure 1 is a perspective view of the device illustrating its application. Fig. 2 is a front elevation of the same. Fig. 3 is a side elevation, and Fig. 4 is a horizontal section through a modified form of the device.

The body A of the device consists of two disks 10 and 11, connected by a horizontal shank 12 of any approved shape, whereby the said body is made to partake substantially of the contour of a bobbin. The disk 11 is formed integral at its under side with a shank 13, and the inner face of said disk 11, at each side of said shank, is downwardly beveled or chamfered, as illustrated at 14, in Figs. 1 and 2. The shank 13 in its under face is preferably provided with a threaded bore adapted to receive a threaded stud 15, forming a portion of a ferrule 16, the said ferrule being provided at its lower end with a similar threaded stud 17, upon which stud the handle 18 of the device is secured. The handle 18 may be of any desired length, and the construction of the ferrule 16 may be varied at will.

Before securing the shank 13 to the ferrule 16 an arm 19 is placed in contact with the upper end of the ferrule, and so held usually by introducing the stud 15 into an aperture centrally formed in the arm and screwing the shank 13 of the body down upon the upper face of the arm, as illustrated in the drawings. The arm 19 is made to extend in opposite directions from the ferrule at a right angle to the longitudinal axis of the spindle or shank section 12 of the body. Thus the said arm is made to extend outward from the ferrule at the front and rear.

Figure 4:
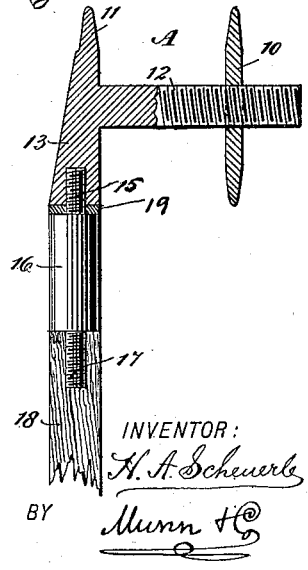

The construction of the body A may be varied in order that the disks may be adjusted to the width of different pulleys, and one modification provided for such an adjustment is illustrated in Fig. 4, in which one extremity of the spindle-section 12 of the body is threaded and the disk 10 screwed thereon; but if in practice it is found desirable, the disk 10 may form an integral portion of the spindle-section 12 and the said spindle-section be screwed into the disk 11, or the thread may be dispensed with entirely and a quicker and more convenient method be employed for adjusting the distance between the disks.

In operation, to place a belt upon a pulley overhead, the belt is made to rest upon or contact with one member—the rear member, for instance, of the arm 19, as shown in Fig. 1—and the belt is thereby elevated and placed over the pulley or in partial contact with its periphery, and when the belt so contacts the body A is turned sidewise and lowered until one disk is located at each side of the pulley and the spindle-section 12 holds the belt in contact with the periphery of the said pulley.

It will be observed by the foregoing description that a belt may be placed upon a pulley without danger or inconvenience to the operator, and that the necessity of using the hand or ropes to draw a belt upon a small or a large pulley is avoided.

When the pulley is located near the ground or within easy reach of the operator, the pole 18 may be dispensed with and the body only employed. In this event, the belt being placed in contact with the pulley, the body is manipulated to fasten the belt upon the said pulley, which is accomplished by causing the disks to contact with the sides of the belt and pulley and the spindle portion of the body to engage with the upper or lower surface of the belt. Thus the belt is compelled to follow and cling to the pulley, and as the latter revolves the device is thrown downward therefrom, and may be readily and conveniently secured by the operator.

Having thus described my invention, I claim as new and desire to secure by Letters Patent—

1. As an improved article of manufacture, a device for placing belts upon pulleys, the same consisting of two opposed disks united by a spindle-section, a shank projected from one of said disks, and an arm secured to said shank and extending laterally therefrom, substantially as shown and described.

2. As an improved article of manufacture, a device for placing belts upon pulleys, the same consisting of opposed disks united by a spindle-section, one of the disks having its inner face at the under edge beveled and provided with an integral shank, and a laterally-projecting arm secured to said shank, substantially as shown and described.

3. In a device for placing belts upon pulleys, the combination, with a body comprising opposed disks connected by a spindle-section and a shank-section integral with one of said disks, of a handle-section connected with the shank-section, and an arm interposed between the handle and shank sections, extending outward horizontally in opposite directions therefrom, substantially as and for the purpose specified.

4. In a device for placing belts upon pulleys, the combination, with a body-section comprising two opposed disks united by a spindle-section, one of said disks being provided with a downwardly-extending shank-section, and having its inner face beveled at each side of the shank, of a ferrule adapted to screw into the shank-section and capable of receiving a handle, and an arm horizontally held between the ferrule and shank-sections, which arm projects in opposite directions at a right angle to the longitudinal axis of the spindle-section of the body, substantially as and for the purpose specified.

HENRY ADAM SCHEUERLE.

Witnesses:
RUDOLF KOELLE,
EMIL HEISTER.